United States Patent [19]
Reinke

[11] Patent Number: 5,459,958
[45] Date of Patent: Oct. 24, 1995

[54] DECOY MECHANISM FOR ADAPTATION TO CREATE VERTICAL MOVEMENT AND COINCIDENT VOCALIZATION

[76] Inventor: Darrell D. Reinke, 3918 Anchor Dr., Madison, Wis. 53714

[21] Appl. No.: 192,127

[22] Filed: Feb. 3, 1994

[51] Int. Cl.⁶ ............................................. A01M 31/06
[52] U.S. Cl. ............................................................ 43/2
[58] Field of Search .................................... 43/2, 3, 1

[56] References Cited

U.S. PATENT DOCUMENTS

| | | | |
|---|---|---|---|
| 1,793,734 | 2/1931 | Cole | 43/2 |
| 2,884,729 | 5/1959 | Walton | 43/2 |
| 3,059,368 | 10/1962 | Wortman | 43/3 |
| 3,350,808 | 7/1965 | Mitchell | 43/8 |
| 3,800,457 | 10/1974 | Barrett | 43/3 |
| 4,128,958 | 12/1978 | Snow | 43/3 |
| 4,322,908 | 4/1982 | McCrory | 43/3 |
| 4,612,722 | 9/1986 | Ferrell | 43/3 |
| 4,821,444 | 4/1989 | Remus | 43/2 |
| 4,845,872 | 7/1989 | Hazlett | 43/3 |
| 4,852,288 | 8/1989 | Payne | 43/3 |
| 4,862,624 | 9/1989 | Dolan | 43/1 |
| 4,893,428 | 1/1990 | Gogon | 43/3 |
| 4,896,448 | 1/1990 | Jackson | 43/3 |
| 4,965,953 | 10/1990 | McKinney | 43/3 |
| 5,098,050 | 3/1992 | Bruns et al. | 43/3 |
| 5,168,649 | 8/1992 | Wright | 43/3 |
| 5,189,823 | 3/1993 | Lanius | 43/3 |
| 5,231,780 | 8/1993 | Gazalski | 43/3 |
| 5,233,780 | 8/1993 | Overholt | 43/2 |
| 5,274,942 | 1/1994 | Lanius | 43/2 |
| 5,289,654 | 3/1994 | Denny et al. | 43/2 |

FOREIGN PATENT DOCUMENTS

| | | | |
|---|---|---|---|
| 481918 | 3/1952 | Canada | 43/2 |
| 262806 | 2/1929 | Italy | 43/2 |
| 129808 | 10/1950 | Sweden | 43/2 |

Primary Examiner—P. Austin Bradley
Assistant Examiner—Chuck Y. Mah
Attorney, Agent, or Firm—DeWitt Ross & Stevens

[57] ABSTRACT

A decoy mechanism is herein described which can be adapted to a variety of commercially available hollow bodied animal species decoys. The mechanism transforms an otherwise static decoy into one which reliably and accurately reproduces species specific mating courtship movements and vocalizations. The mechanism includes vertical movement features, features for controlling a remote portion of the decoy, a species calling device, and activation lines for operating each of the features on the decoy.

10 Claims, 6 Drawing Sheets

1

DECOY MECHANISM FOR ADAPTATION TO CREATE VERTICAL MOVEMENT AND COINCIDENT VOCALIZATION

FIELD OF INVENTION

This invention relates to game decoys, more specifically, to an adaptable decoy mechanism which transforms commercially available hollow bodied animal species decoys into lifelike creatures for the purpose of human observation or hunting.

DESCRIPTION OF PRIOR ART

The majority of previously issued patents relate to the movement of a single, species specific decoy. Only one existing patent relates to a mechanism adapted decoy which has a claim to duplication of mating behavior:

U.S. Pat. No. 5,168,649 was issued on Dec. 8, 1992 to David Wright for a turkey decoy. The patent is issued for a mechanism that is adapted to a commercially available hollow bodied hen turkey decoy for silent, simple, string-activated straight, non-pivotal vertical movement of an entire decoy. The mechanism alters the position of the decoy body from a standing position to a reclined mating position of the wild hen turkey. The mechanism consists of a mounting stake, drop tube, support pin, and control line. The support pin is inserted through an aligned hole in the mounting stake and drop tube to hold the attached decoy in a standing position. Pulling the control line attached to the support pin removes the support pin and causes the decoy to drop vertically onto a sponge base. Prior to or after removal of the support pin there is no movement. Once the pin is removed, repeated action requires the user to approach the decoy and reset the support pin. This action cannot be performed undetected, thus limiting the decoy's effectiveness of attracting game for observation, study, or hunting.

SUMMARY OF THE INVENTION

No prior art mechanism exists that can be adapted to a variety of commercially available hollow bodied animal species decoys that allows a decoy user remote, repeated duplication of mating courtship actions (vertical movement and coincident vocalization). Objects of the mechanism are as follows:

(A) To provide a mechanism that can be adapted to a variety of commercially available hollow bodied animal species decoys.

(B) To provide a mechanism for adaptation to a variety of commercially available animal species decoys, that allows the decoy user accuracy of decoy movement timing and vocalization, crucial to the advancement of current species decoy art.

(C) To provide a mechanism when adapted to a species decoy, that lures an intended species to the decoy without wariness or hesitation due to the decoys realistic movement and coincident vocalization.

(D) To provide a mechanism that transforms an otherwise static decoy into one which reliably and accurately reproduces species specific mating courtship movements and vocalization.

(E) To provide a mechanism that when adapted to a variety of commercially available animal species decoys, duplicates the mating courtship ritual actions of the intended species, stimulating game by sight and sounds that only live species can perform.

(F) To provide a mechanism for adaptation to a variety of commercially available animal species decoys, that allows a hunter or observer the ability to attract an intended species to within a range suitable for study or humane harvest; due to the mechanism adapted decoys realistic attractive movements and coincident vocalization.

(G) To provide a mechanism for adaptation to a variety of commercially available animal species decoys that will operate in all weather conditions.

(H) To provide a mechanism for adaptation to a variety of commercially available animal species decoys, that can be used by non-hunters for close range photography of game that would otherwise be virtually impossible without the use of a stimulating decoy employing vertical movement and coincident vocalization for attraction.

(I) To provide a mechanism that can be adapted to a variety of commercially available animal species decoys that can be operated by any man, woman or child capable of retracting and releasing the mechanism activator line, to attract game for observation, study or hunting.

(J) To provide a mechanism for adaptation to a variety of commercially available animal species decoys that is not duplicated by any other decoy mechanism heretofore.

(K) To provide a mechanism for adaptation to a variety of commercially available animal species decoys that has been repeatedly field tested with proven game attraction.

The objects and advantages of the invention will appear more fully from the following more detailed description of the preferred embodiments of the invention made in conjunction with the accompanying drawings.

| Reference Numerals In Drawings | | | |
|---|---|---|---|
| 12 | Decoy | 38 | Remote Mechanism Activator Line |
| 14 | Mechanism | 40 | Felt Alignment Stop |
| 16 | Ground Mounting Stake | 42 | Self-Lubricating Vertical Travel Sliding Bushing |
| 18 | Ground | 44 | Alignment Bushing |
| 20 | Stake Coupler | 46 | Securement Cap |
| 22 | Extraction Rope | 48 | Threaded Hole |
| 24 | Extraction Rope Hole | 50 | Threaded Machine |
| 26 | Vertical Drive Tube | 52 | Decoy Anchor Hole |
| 28 | Accessory Line Anchor Hole | 54 | Decoy Slotted Opening |
| 30 | Integral Accessory Activator Line | 56 | Decoy Exit Hole |
| 32 | Option Commercially Available Species Calling Device | 58 | Decoy Body Part |
| 34 | Option Accessory Activator Line | 60 | Mechanism Activator Line Exit Hole |
| 36 | Mechanism Activator Lane Anchor Hole | 62 | Rubber Band |

DETAILED DESCRIPTION OF INVENTION

Figure 1:
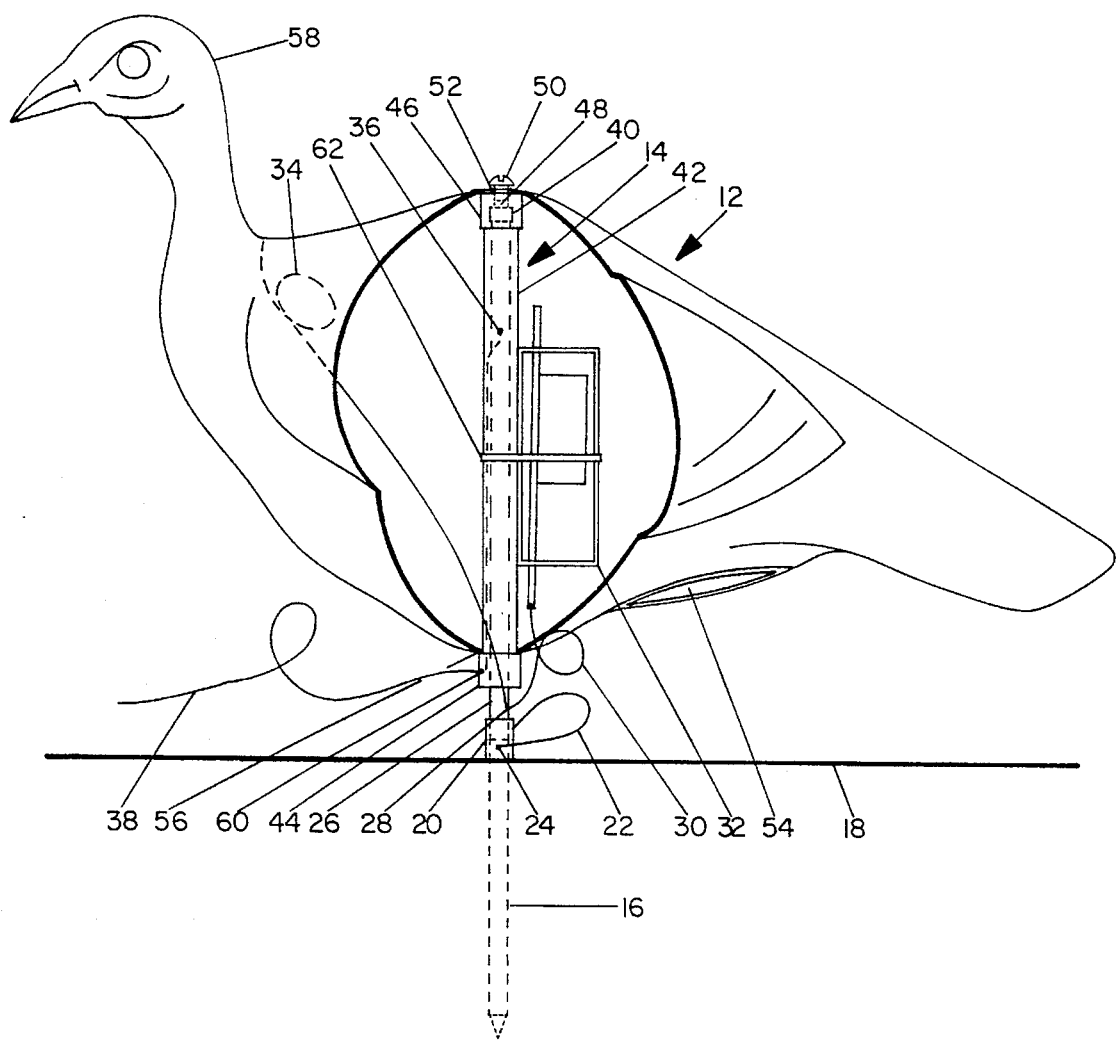
FIG. 1 is a side elevation, partially cut-away view of the decoy mechanism of the present invention in the relaxed state.

A mechanism 14 herein described can be adapted to a variety of commercially available hollow bodied animal species decoys. A commercially available hollow bodied animal species decoy 12 depicted in all FIGS. 1 through 6, for the detailed description of the preferred embodiments is a wild female turkey. However, the mechanism is not limited to such and can be adapted to a variety of commercially available animal species decoys of the following construction: pliable, collapsible hollow body, precisely derailed in size shape and color for the species of intended attraction. Decoy 12 is manufactured by Feather-Flex Decoy, trademark Feather-Flex, Inc. The Feather-Flex decoy requires no modifications for installation of mechanism 14. Rigid hollow bodied animal species decoys can be modified for use with mechanism 14; however, they are not preferred because they are both bulky and noisy.

At the base of mechanism 14 is a ground mounting stake 16 with a formed point at the bottom to allow easy insertion into ground 18. Pressed onto the top of mounting stake 16 is a stake coupler 20. At the base of coupler 20 is an extraction rope 22 threaded through an extraction rope hole 24 in mounting stake 16 and tied together forming a loop. Extraction rope 22 allows easy extraction of mounting stake 16 from ground 18. The base of a vertical drive tube 26 is inserted into coupler 20 after mounting stake 16 is firmly pressed into ground 18. Approximately five eighths of an inch above the bottom of drive tube 26 is an accessory line anchor hole 28 drilled through one side of drive tube 26. Accessory line anchor hole 28 is approximately one thirty-second inch diameter, drilled upwardly at a forty-five degree angle with a radiused external edge. An integral accessory activator line 30 having first and second ends is threaded through accessory line anchor hole 28 with the first end of accessory activator line 30 secured on the inside of drive tube 26. The second end of accessory activator line 30 is attached to an optional commercially available species calling device 32, which is secured by a rubber band 62 to a self lubricating vertical travel sliding bushing 42. An additional accessory activator line 34 can be secured through accessory line anchor hole 28 for movement of a decoy body part 58 during mechanism 14 activation.

A one thirty-second inch diameter mechanism activator line anchor hole 36 is drilled downwardly at a forty-five degree angle approximately one and one half inches down from the top of drive tube 26. A mechanism activator line anchor hole 36 is finished with a radiused external edge. A remote mechanism activator line 38 is threaded through mechanism activator line anchor hole 36, and secured on the inside of drive tube 26.

A felt alignment stop 40 is centrally affixed to the end of drive tube 26 with adhesive, for smooth, quiet, positive alignment of the top end of drive tube 26 during mechanism 14 activation, (See FIGS. 2 through 5). A mechanism activator line exit hole 60 is approximately a one thirty second inch diameter hole drilled through one side of both sliding bushing 42 and an alignment bushing 44, upwardly at a forty-five degree angle, with an external radiused edge. Mechanism activator line 38 is threaded through mechanism activator line exit hole 60.

The sliding bushing 42 is coaxially mounted over drive tube 26, felt alignment stop 40, and mechanism activator line 38. Alignment bushing 44 is pressed onto the bottom end of sliding bushing 42 for alignment of drive tube 26 during mechanism 14 activation (See FIGS. 2 through 5).

A securement cap 46 is pressed onto the top of sliding bushing 42 to secure and stabilize the position of the mechanism 14 within the hollow body decoy 12. A threaded hole 48 is located centrally in the top of securement cap 46 to accept a threaded machine screw 50. Machine screw 50 is inserted into a decoy anchor hole 52 in the top back portion of decoy 12 (FIG. 1) and threaded into threaded hole 48 to anchor decoy 12 to mechanism 14. The decoy anchor hole 52 in decoy 12 can be located in various locations along the back portion of decoy 12 allowing the decoy 12 to duplicate a variety of natural actions such as feeding and alert (See FIG. 6, A & B).

Mechanism 14 is mounted to decoy body 12 by inserting the securement cap 46 end of mechanism 14 through a decoy slotted opening 54, of decoy 12, and pushing the bottom end of drive tube 26 through a decoy exit hole 56 of decoy 12. The threaded hole 48 in securement cap 46 is then aligned with decoy anchor hole 52 (See FIGS. 1 and 6 A & B). Finally, machine screw 50 is inserted through decoy anchor hole 52 and into threaded hole 48. The machine screw 50 is then tightened to secure mechanism 14 to decoy body 12.

To set up the mechanism adapted decoy (FIG. 1 ), the mounting stake 16 is pressed into the ground 18 flush to the bottom of the stake coupler 20 in a location desired for attraction of the intended species. By inserting the base of the drive tube 26 into the top of the stake coupler 20, the mechanism adapted decoy is ready for activation. A remote set up location should be selected within clear view of the mechanism adapted decoy, preferably less than 50 feet in distance. An adequate length of mechanism activator line 38 should be extended in order to reach the selected remote set-up location.

Figure 2:
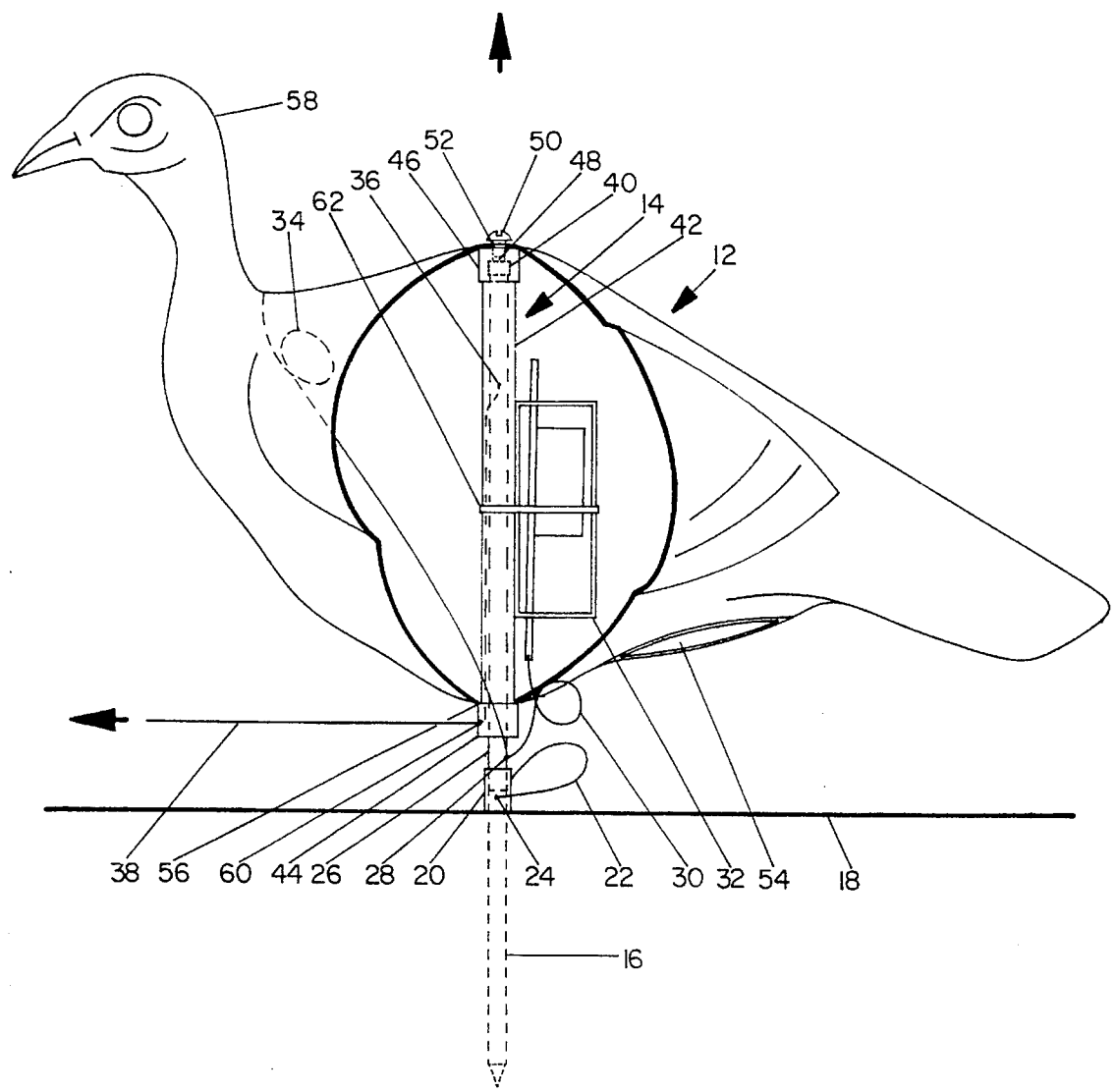
FIG. 2 is a side elevation, partially cut-away view of the decoy mechanism of FIG. 1 shown moving upwardly in a vertical manner as the mechanism activator line is retracted.
Figure 3:
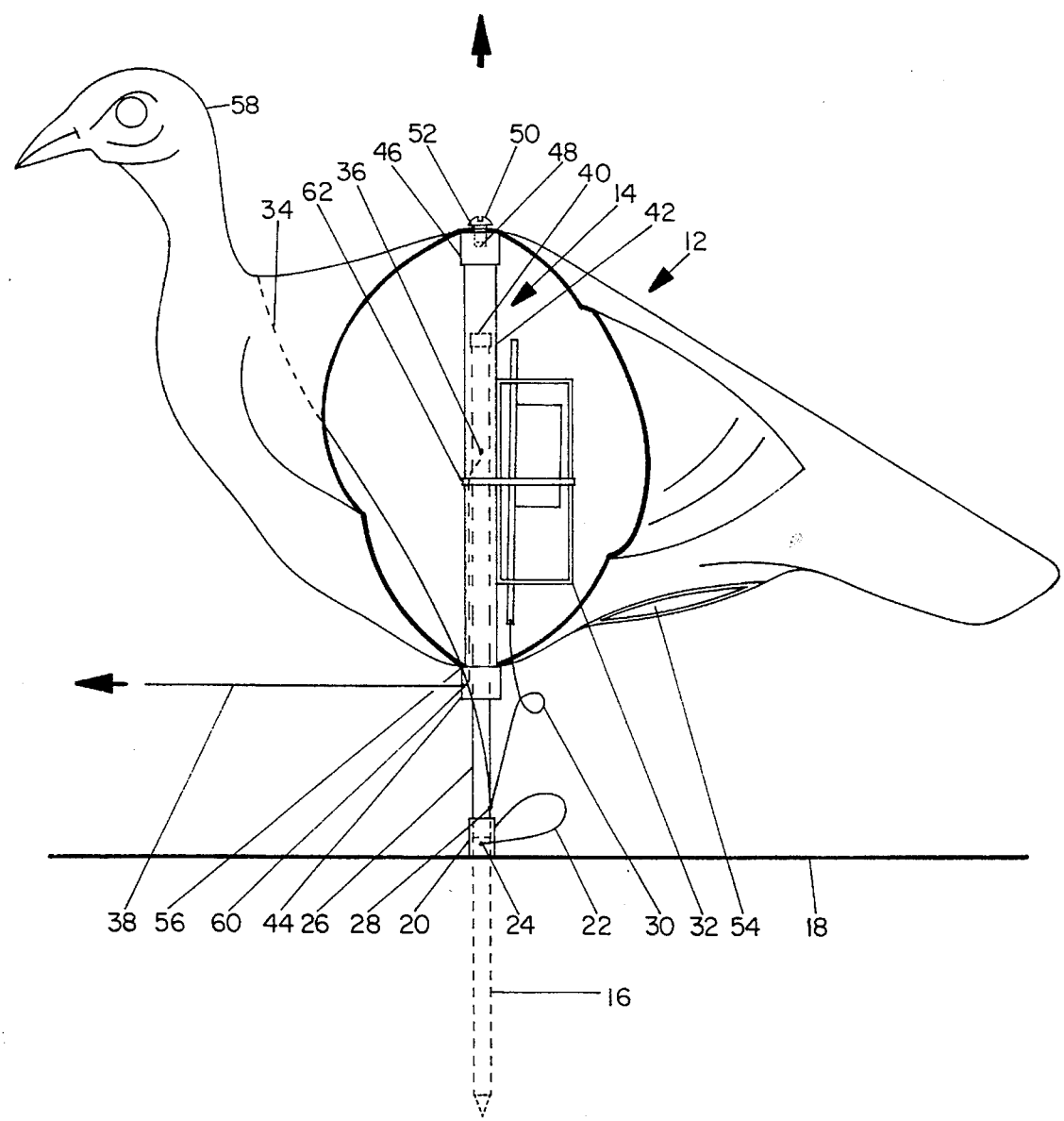
FIG. 3 is a side elevation, partially cut-away view of the decoy mechanism of FIG. 1 shown at three quarters of total vertical travel with accessory activator lines taut.
Figure 4:
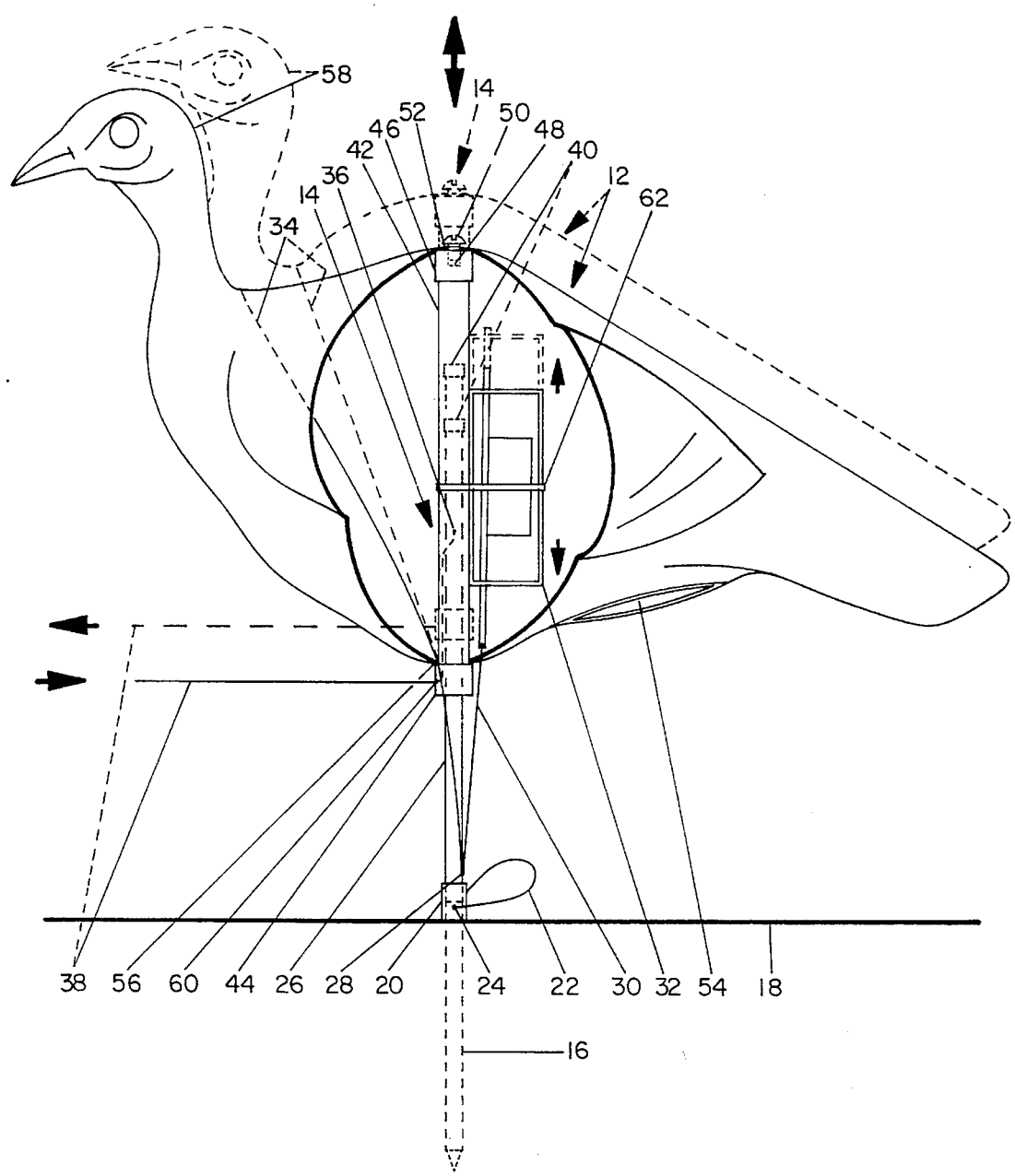
FIG. 4 is a side elevation, partially cut-away view of the decoy mechanism of FIG. 1 shown with vertical movement, call activation and decoy body part movements, while retracting and relaxing the mechanism line.
Figure 5:
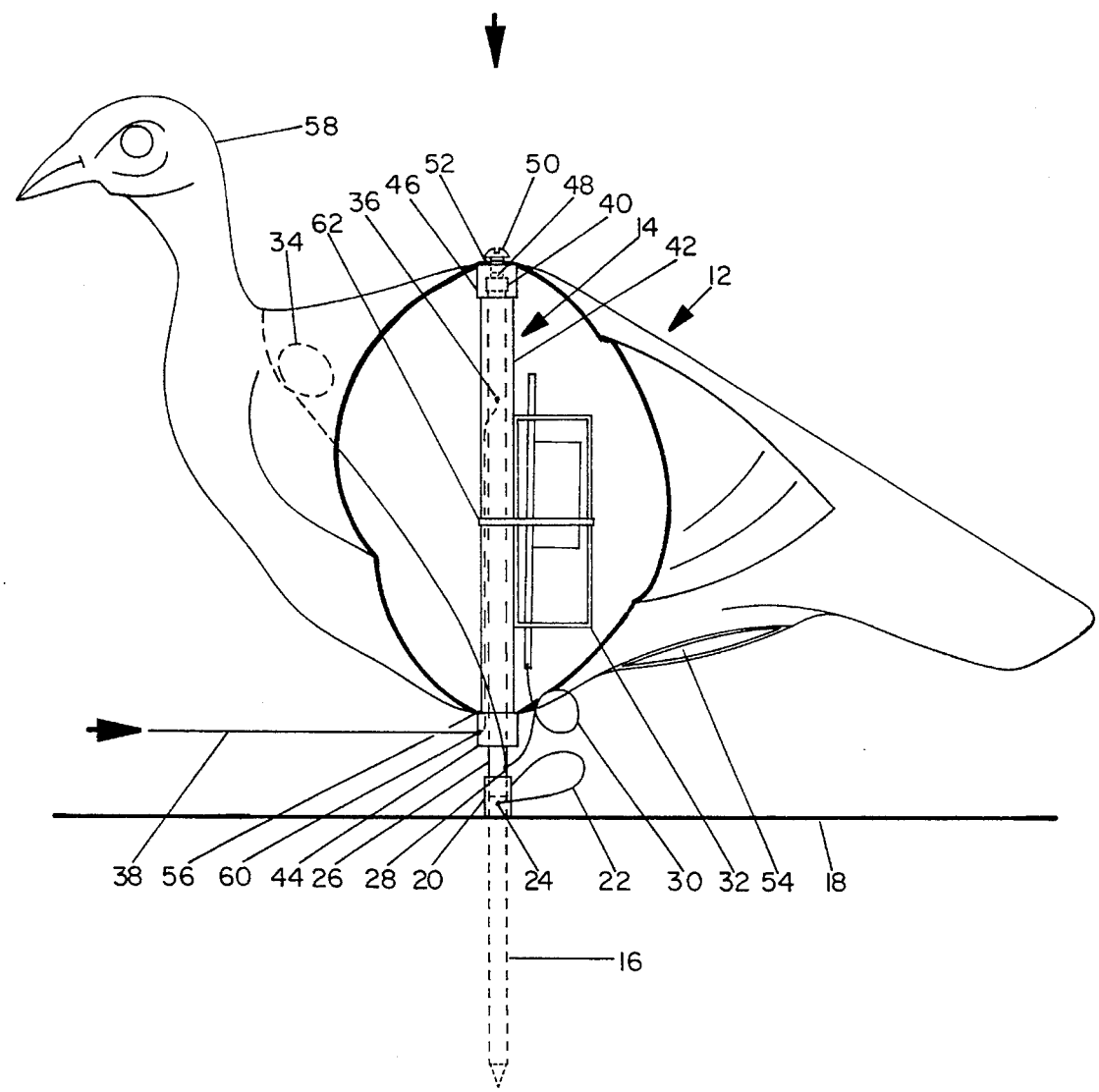
FIG. 5 is a side elevation, partially cut-away view of the decoy mechanism of FIG. 1 shown in the mating posture.

Retracting the mechanism activator line 38 moves the sliding bushing 42 and attached decoy 12 upwardly (See FIG. 2). At approximately three quarters of the vertical travel (FIG. 3), the integral accessory activator and optional accessory activator lines 30, 34 become taut (See FIG. 3). Additional retraction and relaxation of the mechanism activator line 38 activates the optional animal species calling device 32 and decoy body part 58 (See FIG. 4). Repeated retraction and relaxation of the mechanism activator line 38 creates coincident timing of vocalization and movement of the decoy 12 (See FIG. 4). Releasing the mechanism activator line 38, allows the mechanism 14 and attached decoy 12 to descend silently into the mating posture (See FIG. 5). All movements and calling sounds can be repeated from a remote location without approaching the mechanism adapted decoy (See FIGS. 1 through 5).

Figure 6:
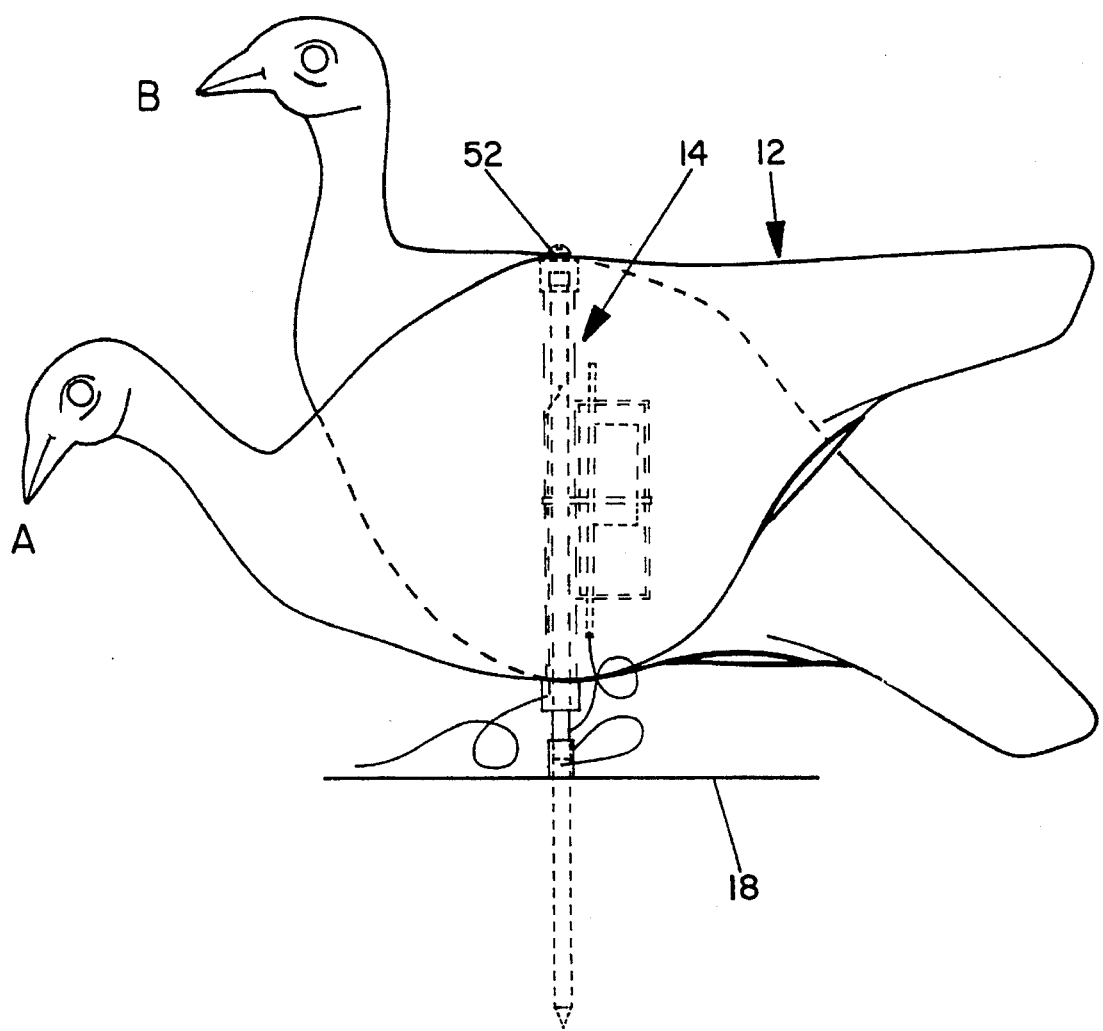
FIG. 6 is a side elevation view of the decoy mechanism of FIG. 1 shown secured at alternate locations along the back of the attached decoy by repositioning the decoy anchor hole, so other natural actions can be duplicated such as a feeding or alert stance.

By locating the decoy anchor hole in various locations and securing the mechanism 14 as shown in FIGS. 6 A & B, additional natural species actions can be performed. FIG. 6A duplicates a species feeding actions when the mechanism activator line 38 is retracted and relaxed. FIG. 6B duplicates the alert stance of the species when the mechanism actuator line 38 is held in a retracted state.

Accordingly, the reader will see that the mechanism of this invention can be adapted to a variety of commercially available hollow bodied animal species decoys such as; turkey, duck, goose, crow, rabbit, squirrel, deer, etc., preferably of the light weight, collapsible type.

Additionally the mechanism adapted decoy permits the user accuracy of timing decoy movement vocalization which is crucial to the advancement of current decoy art.

The inventive decoy mechanism enables a user to modify an existing decoy such that it possesses the ability to lure the species of intended attraction to the decoy without wariness or hesitation due to the added realistic movements and vocalizations of the mechanism activated decoy.

The inventive decoy mechanism transforms an otherwise static decoy into one which reliable and accurately reproduces species specific courtship movements and vocalization.

The inventive decoy mechanism provides vertical movement and coincident vocalization that duplicates the mating courtship ritual actions of an intended species thereby stimulating game by sight and sounds that only live species can perform.

The inventive decoy mechanism provides repeatable vertical movement of the complete decoy body wherein the vertical movement activates both a species calling device and moves one or more specific decoy body parts to duplicate natural body movements of the courtship ritual.

The inventive decoy mechanism offers a hunter or observer the ability to attract an intended species to within a range suitable for study or humane harvest due to the mechanism adapted decoy's realistic attractive movements and coincident vocalization.

The inventive decoy mechanism is capable of operating in all weather conditions and can be used by non-hunters for close range photography of game that would otherwise be virtually impossible without the use of a stimulating decoy for attraction.

The inventive decoy mechanism can be easily adapted to variety of commercially available species decoys, thereby allowing any man, woman or child capable of retracting and releasing the mechanism activator line, to attract game for observation, study, or hunting;

The vertical movement and coincident vocalization of the inventive decoy mechanism is not duplicated by any other decoy mechanism heretofore and has been repeatedly field tested with proven game attraction.

Although the description above contains many specificities, these should not be construed as limiting the scope of the invention but as merely providing illustrations of some of the presently preferred embodiments of this invention. For Example; the mechanism sliding bushing can be made oval, square or any shape compatible to the shape of the vertical drive tube. Also the vertical drive tube can be made of solid material. Moreover the vertical drive tube could be made longer eliminating the mounting stake. The securement cap could also be eliminated, with the mechanism secured inside the decoy body by adhesive, or adhesive backed velcro, etc. In addition the alignment cap could be eliminated, thus eliminating the mechanism activator line exit hole and allowing the mechanism activator line to exit the bottom of the sliding bushing. The felt alignment stop could also be eliminated. The mechanism activator line could also be attached to a motor with a cam attachment allowing the motor and attached cam to retract and relax the mechanism activator line.

All of the above stated modifications will not hinder the actions of the mechanism. However, any of the above stated modifications could adversely effect ease of operation, transportation, durability, expense, ease of adaptation, and accuracy of decoy movement timing and vocalization. The stated embodiment is preferred due to its ease of adaptation to a variety of commercially available hollow bodied animal species decoys. Additional benefits of the preferred embodiment include precision alignment, simple silent activation, compactness, and ease of transport.

While preferred embodiments of the invention have been shown and described, it will be apparent to those skilled in this art that various modifications may be made in these embodiments without departing from the spirit of the present invention. Therefore, all suitable modifications and equivalents fall within the scope of the invention.

I claim:

1. A decoy mechanism for simulating the behavior of an animal species comprising:
   a. a hollow body decoy having an internal surface and an external surface;
   b. a support member adapted to secure the decoy to a base; and
   c. means for conducting repeatable vertical movement to the decoy, wherein the means for conducting repeatable vertical movement comprises:
      1. a first hollow cylindrical member attached to the decoy and slidably positioned on the support member, the first cylindrical member having a first upper end and a second lower end, wherein the second lower end is provided with a trigger line exit opening;
      2. a second cylindrical member concentrically retained within the first hollow cylindrical member, the second cylindrical member having a first upper end and a second lower end; and
      3. a trigger line having first and second ends wherein the first end of the line is attached near the first end of the second cylindrical member and the second end of the line is slidably positioned through the exit opening of the first cylindrical member such that a portion of the trigger line resides between the first and second cylindrical members.

2. A decoy mechanism for simulating the behavior of an animal species comprising:
   a. a hollow body decoy having an internal surface and an external surface;
   b. a support member adapted to secure the decoy to a base; and
   c. means for controlling the movement of a remote portion of the decoy, wherein the means for controlling the movement of a remote portion of the decoy comprises:
      1. a first hollow cylindrical member attached to the decoy and slidably positioned on the support member, the first cylindrical member having a first upper end and a second lower end, wherein the second lower end is provided with a trigger line exit opening;
      2. a second cylindrical member concentrically retained within the first hollow cylindrical member, the second cylindrical member having a first upper end and a second lower end;
      3. an activation line having a first and a second end, wherein the first end of the activation line is attached to the internal surface of the decoy and the second end of the activation line is attached to the second cylindrical member, such that tension on the activation line will cause the movement of the remote portion of the decoy; and 4. a trigger line having a first and a second end wherein the first end of the trigger line is attached near the first end of the second cylindrical member and the second end of the trigger line is slidably positioned through the exit opening of the first cylindrical member such that a portion of the trigger line resides between the first and second cylindrical members.

3. A decoy mechanism for simulating the behavior of an animal species comprising:

a. a hollow body decoy having an internal surface and an external surface;

b. a support member adapted to secure the decoy to a base; and c. means for producing vocalization within the decoy to mimic the sound of the animal species, wherein the means for producing vocalization comprises:

1. a first hollow cylindrical member attached to the decoy and slidably positioned on the support member, the first cylindrical member having a first upper end and a second lower end, wherein the second lower end is provided with a trigger line exit opening;

2. a second cylindrical member concentrically retained within the first hollow cylindrical member, the second cylindrical member having a first upper end and a second lower end;

3. a species-specific vocalization device connected to said first hollow cylindrical member;

4. an activation line having a first end and a second end wherein the first end is attached to the species specific vocalization device and the second end is connected to the second cylindrical member, such that tension on the activation line will cause the vocalization device to activate; and 5. a trigger line having a first and a second end wherein the first end is attached near the upper end of the second cylindrical member and the second end passes through the trigger line exit opening such that a portion of said trigger line resides between the first and the second cylindrical members.

4. A decoy mechanism for simulating the behavior of an animal species comprising:

a. a hollow body decoy having an internal surface and an external surface;

b. a support member adapted to secure the decoy to a base;

c. means for conducting repeatable vertical movement to the decoy;

d. means for controlling the movement of a remote portion of the decoy; and e. means for producing vocalization within the decoy to mimic the sound of the animal species, wherein the means for conducting repeatable vertical movement, the means for controlling the movement of a remote portion of the decoy, and the means for producing vocalization within the decoy to mimic the sound of the animal species comprises:

1. a first hollow cylindrical member attached to the decoy and slidably positioned on the support member, the first cylindrical member having a first upper end and a second lower end, wherein the second lower end is provided with a trigger line exit opening;

2. a second cylindrical member concentrically retained within the first hollow cylindrical member, the second cylindrical member having a first upper end and a second lower end;

3. a decoy activation line having a first and a second end, wherein the first end of the decoy activation line is attached to the internal surface of the decoy and the second end of the activation line is attached to the second cylindrical member, such that tension on the decoy activation line will cause the movement of the remote portion of the decoy;

4. a species-specific vocalization device connected to said first hollow cylindrical member;

5. a vocalization device activation line having a first end and a second end wherein the first end is attached to the species specific vocalization device and the second end is attached to the second cylindrical member, such that tension on the activation line will cause the vocalization device to activate; and 6. a trigger line having a first and a second end wherein the first end of the trigger line is attached near the first end of the second cylindrical member and the second end of the trigger line is slidably positioned through the exit opening of the first cylindrical member such that a portion of the trigger line resides between the first and second cylindrical members and the second end of the trigger line is remotely positioned with respect to the decoy mechanism.

5. A decoy mechanism for simulating the behavior of an animal species comprising:

a. a hollow body decoy having an internal surface and an external surface;

b. a support member adapted to secure the decoy to a base; and c. means remotely connected to the decoy for repeatedly raising and lowering the decoy on the support member in relation to the base, said means for raising and lowering the decoy comprising:

i. a first hollow cylindrical member attached to the decoy and slidably positioned on the support member, the first cylindrical member having a first upper end and a second lower end, wherein the second lower end is provided with a trigger line exit opening;

ii. a second cylindrical member concentrically retained within the first hollow cylindrical member, the second cylindrical member having a first upper end and a second lower end; and iii. a trigger line having first and second ends wherein the first end of the line is attached near the first end of the second cylindrical member and the second end of the line is slidably positioned through the exit opening of the first cylindrical member such that a portion of the trigger line resides between the first and second cylindrical members.

6. The decoy mechanism of claim 5, further comprising means for controlling the movement of a remote portion of the decoy, the means comprising an activation line having a first and a second end, wherein the first end of the activation line is attached to the internal surface of the decoy, and the second end of the activation line is attached to the second cylindrical member.

7. The decoy mechanism of claim 6, wherein the means for controlling the movement of a remote portion of the decoy comprises a remote activator.

8. A decoy mechanism for simulating the behavior of an animal species comprising:

a. a pliable, collapsible hollow body decoy having an internal surface and an external surface;

b. a support member adapted to secure the decoy to a base; and c. means attached to the pliable, collapsible hollow body for controlling the movement of a remote portion of the decoy, said means comprising:

i. a first hollow cylindrical member attached to the decoy and slidably positioned on the support member, the first cylindrical member having a first upper end and a second lower end, wherein the second lower end is provided with a trigger line exit opening;

ii. a second cylindrical member concentrically retained within the first hollow cylindrical member, the second cylindrical member having a first upper end and a second lower end;

iii. an activation line having a first and a second end, wherein the first end of the activation line is attached to the internal surface of the decoy and the second end of the activation line is attached to the second cylindrical member, such that tension on the activation line will cause the movement of the remote portion of the decoy; and iv. a trigger line having a first and a second end wherein the first end of the trigger line is attached near the first end of the second cylindrical member and the second end of the trigger line is slidably positioned through the exit opening of the first cylindrical member such that a portion of the trigger line resides between the first and second cylindrical members.

9. A decoy mechanism for simulating the behavior of an animal species comprising:

a. a hollow body decoy having an internal surface and an external surface;

b. a support member adapted to secure the decoy to a base; and means within the hollow body decoy for producing vocalization within the decoy to mimic the sound of the animal species, said means comprising:

i. a first hollow cylindrical member attached to the decoy and slidably positioned on the support member, the first cylindrical member having a first upper end and a second lower end, wherein the second lower end is provided with a trigger line exit opening;

ii. a second cylindrical member concentrically retained within the first hollow cylindrical member, the second cylindrical member having a first upper end and a second lower end;

iii. a species-specific vocalization device connected to said first hollow cylindrical member;

iv. an activation line having a first end and second end wherein the first end is attached to the species-specific vocalization device and the second end is connected to the second cylindrical member, such that tension on the activation line will cause the vocalization device to activate; and v. a trigger line having a first and a second end wherein the first end is attached near the upper end of the second cylindrical member and the second end passes through the trigger line exit opening such that a portion of said trigger line resides between the first and the second cylindrical members.

10. A decoy mechanism for simulating the behavior of an animal species comprising:

a. a hollow body decoy having an internal surface and an external surface;

b. a support member adapted to secure the decoy to a base;

c. means remotely connected to the decoy for repeatably raising and lowering the decoy on the support member in relation to the base;

d. means for controlling the movement of a remote portion of the decoy; and e. means for producing vocalization within the decoy to mimic the sound of the animal species, wherein said means for repeatably raising and lowering the decoy, said means for controlling the movement of a remote portion of the decoy, and said means for producing a vocalization within the decoy to mimic the sound of the animal species comprises:

i. a first hollow cylindrical member attached to the decoy and slidably positioned on the support member, the first cylindrical member having a first upper end and a second lower end, wherein the second lower end is provide with a trigger line exit opening;

ii. a second cylindrical member concentrically retained within the first hollow cylindrical member, the second cylindrical member having a first upper end and a second lower end;

iii. a decoy activation line having a first and a second end, wherein the first end of the decoy activation line is attached to the internal surface of the decoy and the second end of the activation line is attached to the second cylindrical member, such that tension on the decoy activation line will cause the movement of the remote portion of the decoy;

iv. a species-specific vocalization device connected to said first hollow cylindrical member;

v. a vocalization device activation line having a first and a second end wherein the first end is attached to the species-specific vocalization device and the second end is attached to the second cylindrical member, such that tension on the activation line will cause the vocalization device to activate; and vi. a trigger line having a first and a second end wherein the first end of the trigger line is attached near the first end of the second cylindrical member and the second end of the trigger line is slidably positioned through the exit opening of the first cylindrical member such that a portion of the trigger line resides between the first and second cylindrical members and the second end of the trigger line is remotely positioned with respect to the decoy mechanism.

* * * * *